United States Patent
Jang et al.

(10) Patent No.: US 9,945,038 B2
(45) Date of Patent: Apr. 17, 2018

(54) PREPARATION OF CORROSION-PROTECTIVE COPPER PASTE THROUGH SINGLE PROCESS AND APPLICATION THEREOF TO DIPOLE TAG ANTENNA

(71) Applicant: SEOUL NATIONAL UNIVERSITY R&DB FOUNDATION, Seoul (KR)

(72) Inventors: Jyongsik Jang, Seoul (KR); Keunyoung Shin, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 211 days.

(21) Appl. No.: 14/909,919

(22) PCT Filed: May 27, 2014

(86) PCT No.: PCT/KR2014/004687
§ 371 (c)(1),
(2) Date: Feb. 3, 2016

(87) PCT Pub. No.: WO2015/072636
PCT Pub. Date: May 21, 2015

(65) Prior Publication Data
US 2016/0160359 A1    Jun. 9, 2016

(30) Foreign Application Priority Data
Nov. 18, 2013  (KR) .................. 10-2013-0139672

(51) Int. Cl.
*C03C 25/68* (2006.01)
*C23F 1/16* (2006.01)
(Continued)

(52) U.S. Cl.
CPC .............. *C23F 1/16* (2013.01); *B22F 1/0062* (2013.01); *B22F 1/0074* (2013.01);
(Continued)

(58) Field of Classification Search
CPC .. C23F 1/16; C23F 1/18; B22F 1/0062; B22F 1/0074; B22F 1/0088; B22F 2001/0066
(Continued)

(56) References Cited

U.S. PATENT DOCUMENTS

| 5,258,522 A | 11/1993 | Tsuchida et al. ............. 548/110 |
| 2008/0258793 A1* | 10/2008 | Endo .................. G06K 19/0705 327/292 |

(Continued)

FOREIGN PATENT DOCUMENTS

| KR | 10-2008-0062128 | 7/2008 | ............... H01B 1/22 |
| KR | 10-2011-0047510 | 5/2011 | ............... H01Q 9/16 |

(Continued)

OTHER PUBLICATIONS

Wikipedia, "Mole (unit)" via https://en.wikipedia.org/wiki/Mole_(unit) ; pp. 1-8; No date available.*
(Continued)

*Primary Examiner* — Binh X Tran
(74) *Attorney, Agent, or Firm* — Harness, Dickey & Pierce, P.L.C.

(57) ABSTRACT

Provided are a method of producing corrosion-protective copper paste through a single process and an application thereof to a dipole tag antenna. Copper powder is surface-etched by using a hydrochloric acid in an inert gas atmosphere, a phosphoric acid aqueous solution is added thereto to form copper phosphate on the etched surface of the copper powder, and then, a vinyl imidazole-silane copolymer and poly(4-styrenesulfonate) were introduced thereto to form a corrosion-protective coating layer on the surface of copper powder on which the copper phosphate has been formed, and a centrifuge and an agate mortar are used to prepare a copper paste having high viscosity and high dispersability. When a copper paste thin film is formed on a flexible film
(Continued)

by screen printing, a produced dipole tag antenna may have high efficiency.

24 Claims, 6 Drawing Sheets (51) Int. Cl.
    *H01Q 9/26*     (2006.01)
    *C09D 11/52*     (2014.01)
    *H01B 1/22*     (2006.01)
    *B22F 1/00*     (2006.01)

(52) U.S. Cl.
    CPC ............ *B22F 1/0088* (2013.01); *C09D 11/52* (2013.01); *H01B 1/22* (2013.01); *H01Q 9/26* (2013.01); *B22F 1/004* (2013.01); *B22F 1/0048* (2013.01); *B22F 1/0055* (2013.01)

(58) Field of Classification Search
    USPC ........................................ 216/105, 106, 108
    See application file for complete search history.

(56) References Cited

U.S. PATENT DOCUMENTS

| | | | | |
|---|---|---|---|---|
| 2009/0008713 A1* | 1/2009 | Kawashima | .......... | G02F 1/1362 257/347 |
| 2009/0179198 A1* | 7/2009 | Bailey | ................ | H01L 51/0013 257/40 |
| 2009/0286361 A1* | 11/2009 | Kawashima | ........ | H01L 51/0005 438/149 |
| 2012/0025757 A1* | 2/2012 | Dembo | .............. | G01R 29/0857 320/107 |
| 2012/0120742 A1* | 5/2012 | Inoue | ..................... | G11C 5/141 365/189.14 |
| 2014/0342094 A1* | 11/2014 | Hofener | .................... | C23C 4/04 427/447 |

FOREIGN PATENT DOCUMENTS

| | | | | |
|---|---|---|---|---|
| KR | 10-2011-0073421 | 6/2011 | ............. | C23C 22/52 |
| KR | 10-2012-0045446 | 5/2012 | ............... | H01Q 7/00 |
| KR | 10-2013-0110389 | 10/2013 | ............... | H01B 1/22 |

OTHER PUBLICATIONS

Wikipedia, "Molar concentration", via https://en.wikipedia.org/wiki/Molar_concentration ; pp. 1-6; No date available.*
Kim et al., (1997). "Copper corrosion protection of various silane-modified poly(vinylimidazole)(1)s". *Journal of Applied Polymer Science.* 64:2585-2595 See abstract.
Kim et al., (2012). "Use of copper ink for fabricating conductive electrodes and RFID antenna tags by screen printing". *Current Applied Physics.* 12:473-478.
International Search Report (ISR) dated Sep. 2, 2014 in PCT/KR2014/004687 published as WO 2015/072636 with English Translation.

* cited by examiner

PREPARATION OF CORROSION-PROTECTIVE COPPER PASTE THROUGH SINGLE PROCESS AND APPLICATION THEREOF TO DIPOLE TAG ANTENNA

CROSS-REFERENCE TO RELATED APPLICATIONS

This application is a national phase application of PCT Application No. PCT/KR2014/004687, filed on May 27, 2015 which claims priority to Korean Patent Application No. 10-2013-0139672, filed Nov. 18, 2013. The entire disclosures of the applications identified in this paragraph are incorporated herein by reference.

FIELD

The present invention relates to a method of preparing copper paste having electric conductivity and an application thereof to a dipole tag antenna, and, in particular, a method of preparing copper paste for a dipole tag antenna, the method including introducing a hydrochloric acid aqueous solution to copper powder to etch the surface thereof, introducing a phosphoric acid aqueous solution, a vinyl imidazole-silane copolymer, and poly(4-styrenesulfonate) to form a corrosion-protective coating layer on the surface of copper powder, and using a centrifuging method.

BACKGROUND

For an electronic material, conductive paste having a certain level of viscosity prepared by adding and dispersing a conductive material in a binder resin, such as silicon, is mainly used. The conductive paste is then hardened for antioxidation by using a thermosetting resin, such as acryl, epoxy, or ester, before use.

For use as a conductive filler to be added to the conductive paste to provide conductivity, carbonaceous compounds, such as carbon black or graphite; various metal powder, such as silver or nickel; or various non-conductive powder or short fiber are surface-treated with metal, such as silver. In particular, silver paste using silver powder has a surface resistance of $10^{-4} \Omega/\square$ (square). Due to such a high conductivity, the silver paste is widely used as an electronic material in various fields.

However, such a paste using silver powder is relatively expensive (700 dollars/kg) compared to other metallic materials. Accordingly, copper paste has been introduced as an alternative to the silver paste due to its relatively low price. Compared to silver paste, copper paste has price competitiveness (7 dollars/kg) while having conductivity, a level similar to that of silver paste. Since copper paste has relatively high conductivity when price is taken into consideration, the use thereof as an electronic material is rapidly increasing due to its economic edge.

However, copper paste is highly likely to be oxidized compared to silver or other metals. That is, when copper paste is used as an electronic material and a long period of time elapses thereafter, oxygen in air or oxygen included in a binder resin may combine with copper powder to oxidize the surface of copper particles, leading to a rapid decrease in conductivity and losing its function as the electronic material. To solve these problems, a corrosion-protective agent is used to form a corrosion-protective coating layer on a copper surface. A representative example of the corrosion-protective agent is an imidazole compound. When a surface treatment agent containing an imidazole compound, such as 2-alkylimidazole, 2-arylimidazole, 2-alkylbenzimidazole, 2-aralkylbenzimidazole, or 2-aralkylimidazole, is used, the oxidation of a copper surface is effectively prevented. However, when the heat treatment temperature is 150° C. or more, a serious thermal history occurs. As a result, the formation of an oxidation film on the surface is promoted, and conductivity may rapidly decrease (Korean Patent Application No. 10-2011-7002997).

To obtain good conductivity, copper paste should have copper powder homogeneously dispersed in a binder resin. However, in the case of a conventional copper paste composition, the dispersion state of copper powder in a resin during mixing is not good, and accordingly, when used as an electronic material, corrosion may occur from where copper powder is not appropriately distributed (Korean Patent Application No. 10-2006-0137527).

Meanwhile, to apply copper paste to an electronic material, a pattern formation process is necessary. Conventionally, the pattern formation process is performed by photolithography, which is a semiconductor process technique. However, the photolithography has many limitations in terms of large-size patterning, a process price, and a process time. Accordingly, screen printing, which is a simple, low-cost, and environmentally friendly method, is used as an alternative to the pattern formation process based on copper (Current Applied Physics, 2012, vol. 12, pp 473-478). The environmentally-friendly or economic screen printing is distinguishable from an optical patterning in view that a large-size patterning is performed by using a small amount of conducting ink for a short period of time. Most of all, since conductive ink is efficiently coated on a flexible substrate through a fine mesh having openings for screen printing, the screen-printing can be used for various flexible electronic devices.

Accordingly, there is a need to develop a method of preparing copper paste that is corrosion-protective for a long period of time, and has excellent electric conductivity, heat resistance characteristics, and excellent dispersability of copper powder. In particular, to improve adhesive properties of a corrosion-protective layer on a copper surface by performing a silane treatment on an imidazole compound, maintain flexibility of a copper paste electrode, and have uniform resistance properties, there is a need to develop a method of preparing a binder by adding a high-viscosity polymer-based compatibilizer or a binder without an additional thermosetting process. In addition, the prepared copper paste is used as conductive ink for screen printing to simply and rapidly dope an electrode material on a flexible film, and then, a copper paste electrode having a target shape and size is manufactured for use in various electric/electronic devices.

DETAILED DESCRIPTION

Technical Problems

The present invention provides a method of preparing copper paste having excellent dispersability, wherein the method includes using a hydrochloric acid aqueous solution, a phosphoric acid aqueous solution, and a vinyl imidazole-silane copolymer to form a corrosion-protective coating layer on the surface of copper powder, introducing a binder and poly(4-styrenesulfonate), which is a compatibilizer, and using a centrifuging method.

The present invention also provides a copper paste thin film for a dipole tag antenna, formed by screen-printing using copper paste.

The inventors of the present application had conducted many experiments and in-depth research and found that, unlike in conventional methods in which a metal paste composition is prepared by using a copper paste resin and a hardening agent, copper paste having excellent electric conductivity and heat resistance properties and homogeneous resistance characteristics for dipole tag antenna can be prepared by using a corrosion protective process in which a phosphoric acid aqueous solution, a vinyl imidazole-silane copolymer, and poly(4-styrenesulfonate) are added to copper powder, and the prepared copper paste is used as screen printing ink.

Technical Solutions

According to the present invention, a hydrochloric acid aqueous solution, a phosphoric acid aqueous solution, a vinyl imidazole-silane copolymer, and poly(4-styrenesulfonate) are introduced to copper powder, and a centrifuging method is used to prepare copper paste for a dipole tag antenna.

An aspect of the present invention provides a method of preparing a corrosion-protective copper paste for a dipole tag antenna through a single process includes:

(A) introducing a hydrochloric acid aqueous solution to copper powder in an inert gas atmosphere to etch a surface of copper powder;

(B) introducing a phosphoric acid aqueous solution to etched surface of copper powder to form copper phosphate;

(C) adding a vinyl imidazole-silane copolymer and a poly(4-styrenesulfonate) aqueous solution to the resultant copper powder containing copper phosphate to form a corrosion-protective coating layer; and, (D) subjecting the resultant copper powder containing the corrosion-protective coating layer to a centrifuger and an agate mortar.

Unless defined otherwise in the present specification, numeral ranges, such as time, temperature, amount, size, or the like, indicate ranges that optimize the preparation method according to the present invention.

Advantageous Effects

A method of preparing corrosion-protective copper paste through a single process according to the present invention has not been disclosed yet. When this method is used, copper paste having excellent heat resistance and electric conductivity properties can be easily prepared by adding a corrosion-protective agent to copper powder in a single process and using a centrifuging method. Also, screen printing is used to form a copper paste thin film having a target shape and size, and a uniform thickness, without difficulties. Also, due to the use of copper powder which has a competitive edge in terms of price, mass-production can be embodied at low costs. Furthermore, a copper paste thin film which is formed by using the method may have uniform electric conductivity, and when bent due to an external force, the copper paste thin film may retain a high level of flexibility, providing high-efficiency dipole tag antenna characteristics. In addition, when the formed copper paste thin film is used in a dipole tag antenna, the copper paste thin film-based dipole tag antenna can be applied into or embodied as a sign receiving apparatus, such as an object-recognizing airport metal detector or a human body sensor network.

BEST MODE

Copper powder used in process (A) may be in the form of plate-shaped flake, sphere, beads, or dendrite, and may have a size of 1 to 10 μm. However, the size of copper powder is not limited thereto, and may be outside the upper limit or lower limit of this range.

A reactor may include an inlet portion through which a chemical material dispersed in a solution is provided while inert gas atmosphere is maintained. The shape and size of the reactor are not limited, and may vary depending on its purpose. Under inert gas atmosphere, the chemical material dispersed in a solution may be loaded into the reactor by using a syringe through the inlet portion.

All reactions occurring in the reactor may be performed at room temperature, and at a stirring speed of 300 to 1000 rpm. When the stirring speed is 300 rpm or less, a reaction may not smoothly occur, and when the stirring speed is 1,000 rpm or more, bubbles may occur in an aqueous solution and accordingly, a reaction may not occur under inert gas atmosphere.

A maximum volume of copper powder to be located inside the reactor may be half the volume of the reactor. When the volume of copper powder is greater than the half the volume of the reactor, due to excess copper powder, a corrosion-protective surface treatment may not be smoothly performed.

The inert gas may be nitrogen gas, argon gas, or helium gas. However, the inert gas is not limited thereto, and may be any gas that can be used as inert gas.

To effectively perform a surface etching process on copper powder, a hydrochloric acid was used. A concentration of the hydrochloric acid may be in a range of 0.5 to 1 mol (M) while in an aqueous solution, and a reaction time may be at least one minute. A volume of the hydrochloric acid aqueous solution may be in a range of 1 to 2 milliliters (mL) based on 1 g of copper.

In process (B), a copper phosphate aqueous solution is prepared by a treatment using a phosphoric acid. The phosphoric acid may be used in an amount of 1 to 2 M while in an aqueous solution, which is a polar solvent, and a reaction time may be at least 1 minute. A volume of a phosphoric acid aqueous solution to be used may be in a range of 3 mL to 5 mL based on 1 g of copper.

In process (C), a vinyl imidazole-silane copolymer and a poly(4-styrenesulfonate) aqueous solution may be prepared by radical polymerization, and an initiator used herein may be any initiator that can be used in a general solution polymerization process. An example of the initiator is 2,2-azobisisobutyronitrile.

For use as a silane monomer for the preparation of the vinyl imidazole-silane copolymer, a silane having a vinyl group may be used. Examples of such a silane are vinyl trimethoxysilane, vinyl triethoxysilane, vinyl triacethoxysilane, γ-methacryloxypropyltrimethoxysilane, allyl trimethoxysilane, and methacryloxy propyl trimethoxysilane, but are not limited thereto.

When radical polymerization is performed to produce the vinyl imidazole-silane copolymer, an amount of the silane monomer may be determined such that a volumetric ratio of the silane monomer is in a range of 5 to 20 based on 100 of the total volume of the vinyl imidazole monomer and the silane monomer. A concentration of the initiator may be in a range of 0.05 to 0.5 parts by weight based on 100 parts by weight of the vinyl imidazole monomer and the silane monomer.

A copolymerization time may be in a range of 12 hours to 24 hours. When the copolymerization time is less than 12 hours, monomers may not be sufficiently formed into a copolymer, and when the copolymerization time is greater than 24 hours, a process time is long, and accordingly, the copolymerization time is not appropriate in terms of the process time and the process cost.

A reaction temperature for the copolymerization may be in a range of 50 to 70° C., at which the initiator used for solution polymerization forms radicals, thereby causing monomers to be polymerized.

A volume of the vinyl imidazole-silane copolymer may be in a range of 0.5 to 1 mL based on 1 g of copper powder.

A ratio of an initiator to a styrenesulfonate monomer when the poly(4-styrenesulfonate) aqueous solution is prepared by polymerization may be in a range of 0.1 to 0.2 mol based on 100 mol of the monomer. A reaction temperature for polymerization may be in a range of 40 to 50° C., at which an initiator used for polymerization forms radicals to cause styrenesulfonate monomers to be polymerized. A polymerization time may be in a range of 6 to 24 hours, during which styrenesulfonate monomers are completely polymerized to produce a polymer.

A volume of a poly(4-styrenesulfonate) aqueous solution to be added may be in a range of 0.5 to 1 mL based on 1 g of copper powder. A stirring time for forming a corrosion-protective coating layer may be in a range of 1 to 3 hours.

In operation (D), regarding a centrifuger, a precipitation speed of copper paste may be in a range of 5,000 to 10,000 rpm, and a precipitation time may be in a range of 5 to 30 minutes.

To effectively prepare copper paste, copper paste obtained as described above may be re-distributed in ethanol, and then, the result is centrifuged twice.

Copper paste obtained by the centrifuging may have higher dispersability by using an agate mortar.

The copper paste is subjected to screen printing to manufacture a dipole tag antenna.

A screen printer available herein may be a printer for electronic device printing patterns. For example, SM-S550, manufactured by Sunmechanix, may be used. However, the screen printer is not limited thereto, and may be any printer that includes a fine mesh for a mask having openings arranged in a certain pattern, a squeeze for coating hydrophobic ink, and a stage module, supporting a membrane disposed under the mask, to perform accurately printing with copper paste ink.

A support available herein may not be particularly limited, and may be any one that is applicable to printing equipment. For example, a polymer film having high flexibility and transparency may be used. Examples of the polymer film are a polyethyleneteleptalate film and a polyimide film.

The shape and size of a copper paste thin film formed by the printing may be controllable depending on a mask process. The thickness of the copper paste thin film may be controlled by adjusting an interval of the fine mesh. For example, a mask having a fine mesh having 270 to 300 pores within the interval of 1 cm may be used.

A printing speed of the screen printer may be in a range of 4,500 rpm to 6,000 rpm.

The copper paste thin film may have a tetragonal or ring pattern having tens to hundreds mm formed through the fine mesh. However, the shape, length, and pattern of the copper past thin film are not limited thereto.

To evaluate performances of a dipole tag antenna based on the copper paste thin film, conductive metal is connected to both ends of the thin film to form a dipole tag antenna electrode through which a current flows. Metal cables are connected with the copper paste thin film by using copper tape, silver paste, or the prepared copper paste.

To evaluate performances of the copper paste thin film-based dipole tag antenna, a cable of an antenna analyzer (E5071B ENA RF network analyzer, Agilent technologies) port is connected to form a circuit, and the antenna analyzer was used to calculate the dynamic bandwidth, voltage standing wave ratio (VSWR), return loss, transmitted power efficiency, and recognition distance of the dipole antenna.

When the copper paste thin film-based dipole tag antenna is connected to the antenna analyzer port through an output terminal and an input terminal, impedance matching for maximizing power transmission by reducing reflection caused by the impedance difference of the two different terminals may be adjusted to be 50Ω. This may contribute to a substantial decrease in the probability that oscillation occurs and maintenance of impedance up to a high frequency.

A thickness of the copper paste thin film for a dipole tag antenna may be at most 30 μm.

Hereinafter, embodiments of the present invention will be described by referring to Examples. However, the scope of the present invention is not limited thereto.

EXAMPLE 1

Figure 1A:
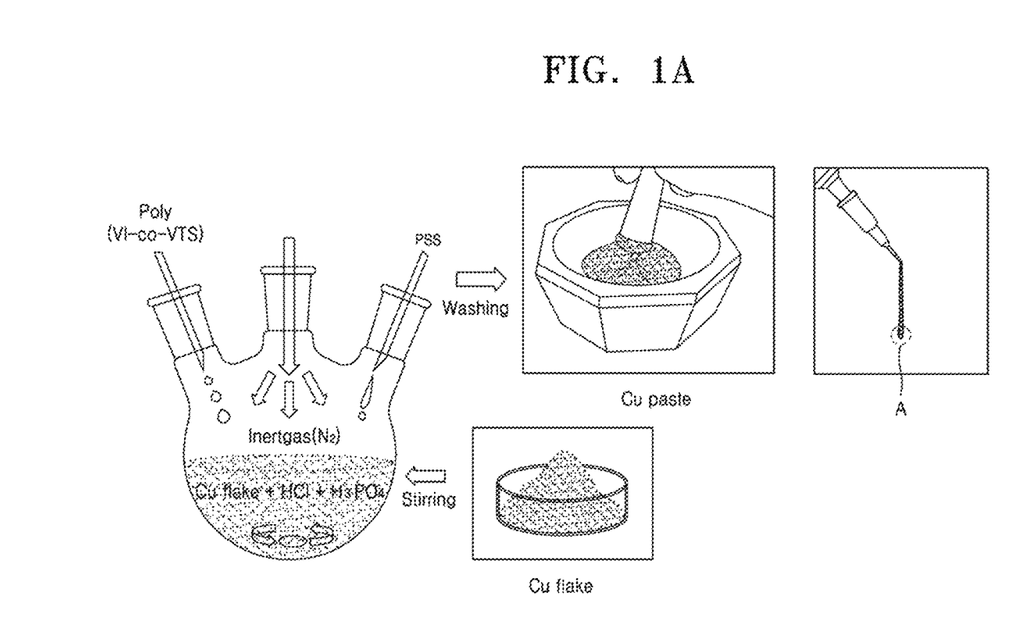
FIG. 1A illustrates a method of preparing copper paste prepared according to Examples 1, 8, and 15.
Figure 1B:
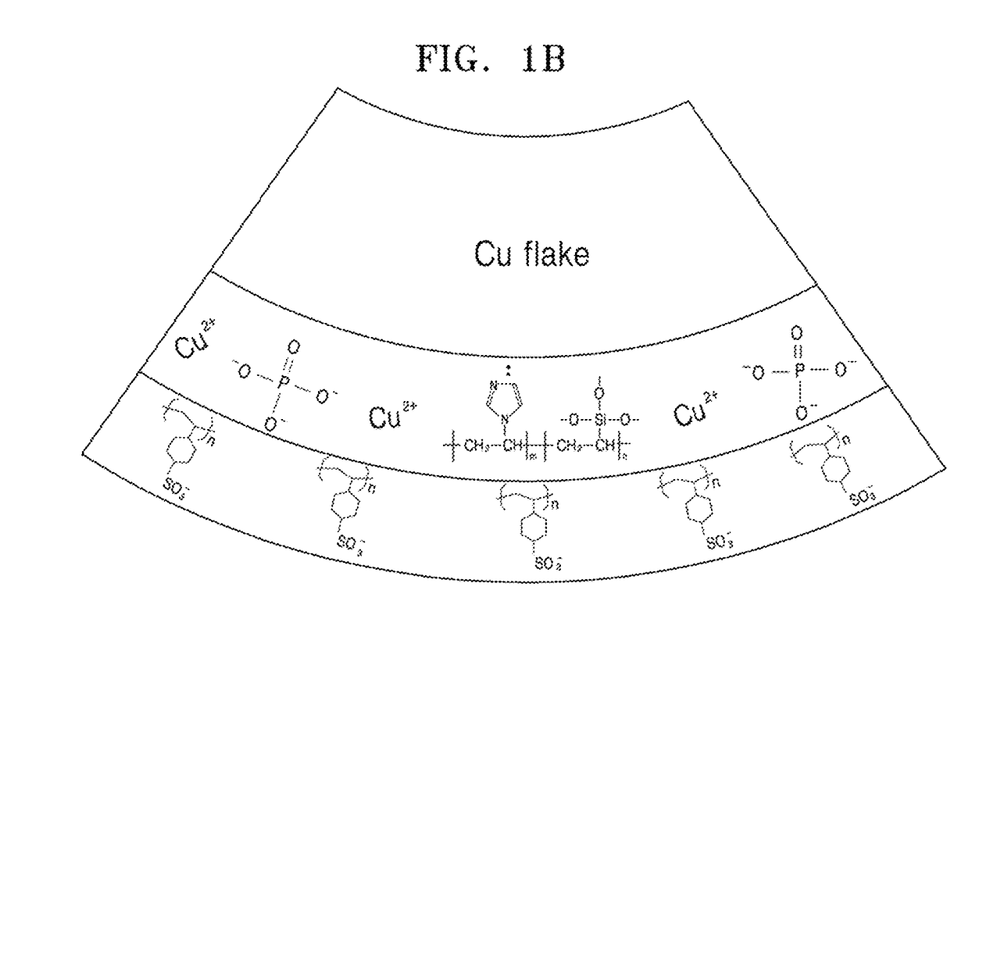
FIG. 1B illustrates an enlarged view of portion A of FIG. 1A.

10 g of copper powder and a stirrer were positioned inside a 100 mL glass reactor. Nitrogen gas, which is inert gas, was loaded into the glass reactor, and 15 mL of a 1 M hydrochloric acid aqueous solution was slowly added thereto through a syringe, thereby etching the surface of copper powder. In this regard, a stirring speed was maintained at 500 rpm. Then, when 40 mL of a 1.5 M phosphoric acid aqueous solution was slowly added thereto through a syringe, the color of the resultant solution was changed into light blue, indicating the formation of a copper phosphate aqueous solution (FIGS. 1A and 1B).

EXAMPLE 2

Like in the manner used in Example 1, 10 mL of a 1 M hydrochloric acid aqueous solution was slowly added through a syringe, and then, when 40 mL of a 1.5 M phosphoric acid aqueous solution was slowly added through a syringe, the color of the resultant solution was changed into light blue, indicating the formation of a copper phosphate aqueous solution. When a volume of the hydrochloric acid aqueous solution was 10 mL or less, it was seen that the copper surface was not appropriately etched.

EXAMPLE 3

Like in the same manner as in Example 1, when 20 mL of a 1.5 M phosphoric acid aqueous solution was slowly added thereto through a syringe, the color of the resultant solution was changed into light blue, indicating the formation of a copper phosphate aqueous solution. When a volume of the hydrochloric acid aqueous solution was 20 mL or more, the copper surface was excessively etched, causing agglomeration.

EXAMPLE 4

Like in the same manner as in Example 1, a phosphoric acid aqueous solution was used to etch copper powder, and then, when 40 mL of a 1 M phosphoric acid aqueous solution was slowly added through a syringe, the color of the resultant solution was changed into light blue, indicating the formation of a copper phosphate aqueous solution. When a concentration of the phosphoric acid aqueous solution was 1 M or less, it was seen that the copper phosphate aqueous solution was not formed.

EXAMPLE 5

Like in the same manner as in Example 1, a phosphoric acid aqueous solution was used to etch copper powder, and then, when 40 mL of a 2 M phosphoric acid aqueous solution was slowly added through a syringe, the color of the resultant solution was changed into light blue, indicating the formation of a copper phosphate aqueous solution. When a concentration of the phosphoric acid aqueous solution was 2 M or more, it was seen that due to excess copper phosphate, oxidization highly likely occurred.

EXAMPLE 6

Like in the same manner as in Example 1, a phosphoric acid aqueous solution was used to etch copper powder, and then, when 30 mL of a 1.5 M phosphoric acid aqueous solution was slowly added through a syringe, the color of the resultant solution was changed into light blue, indicating the formation of a copper phosphate aqueous solution. When a volume of the phosphoric acid aqueous solution was 30 mL or less, it was seen that the copper phosphate aqueous solution was not formed.

EXAMPLE 7

Like in the same manner as in Example 1, a phosphoric acid aqueous solution was used to etch copper powder, and then, when 50 mL of a 1.5 M phosphoric acid aqueous solution was slowly added through a syringe, the color of the resultant solution was changed into light blue, indicating the formation of a copper phosphate aqueous solution. When a volume of the phosphoric acid aqueous solution was 50 mL or more, it was seen that due to excess copper phosphate, oxidization highly likely occurred.

EXAMPLE 8

9 mL of vinyl imidazole monomer and 1 mL of vinyl trimethoxy silane monomer were completely dissolved in 100 ml of 2-propanol by stirring in a constant-temperature bath while nitrogen gas, which is inert gas, was loaded thereinto at a temperature of 60° C. 10 mg of 2,2-azobisisobutyronitrile, which was used as an initiator, was added thereto, and the resultant was subjected to solution-polymerization for 12 hours to produce a vinyl imidazole-vinyl trimethoxy silane copolymer. A viscosity of the vinyl imidazole-vinyl trimethoxy silane copolymer was measured by using a rheometer. The obtained viscosity was 14 kPa s.

7 mL of the vinyl imidazole-vinyl trimethoxy silane copolymer was added to the copper phosphate aqueous solution through a syringe to form a corrosion-protective coating layer on the copper surface (FIGS. 1A and 1B).

EXAMPLE 9

Like in the same manner as in Example 8, 0.5 mL of vinyl trimethoxy silane monomer was used, and an initiator-induced radical polymerization was performed thereon to obtain a vinyl imidazole-vinyl trimethoxy silane copolymer. A viscosity of the vinyl imidazole-vinyl trimethoxy silane copolymer was measured by using a rheometer, and the obtained viscosity was 16 kPa s. Due to the introducing the vinyl imidazole-vinyl trimethoxy silane copolymer to the copper phosphate aqueous solution, a corrosion-protective coating layer was able to be formed on the copper surface. When a volume of the vinyl trimethoxy silane monomer was 0.5 mL or less, it was seen that due to the low-concentration silane, adhesive properties of a corrosion-protective coating layer formed on the surface of copper powder was decreased.

EXAMPLE 10

Like in the same manner as in Example 8, 2 mL of vinyl trimethoxy silane monomer was used, and an initiator-induced radical polymerization was performed thereon to obtain a vinyl imidazole-vinyl trimethoxy silane copolymer. A viscosity of the vinyl imidazole-vinyl trimethoxy silane copolymer was measured by using a rheometer, and the obtained viscosity was 18 kPa s. Due to the introducing the vinyl imidazole-vinyl trimethoxy silane copolymer to the copper phosphate aqueous solution, a corrosion-protective coating layer was able to be formed on the copper surface. When a volume of the vinyl trimethoxy silane monomer was 2 mL or more, it was seen that due to the high-concentration silane, the thickness of the corrosion-protective coating layer formed on the copper surface was increased, leading to a decrease in electric conductivity.

EXAMPLE 11

Like in the same manner as in Example 8, 5 mg of an initiator was used and radical polymerization was performed thereon to produce a vinyl imidazole-vinyl trimethoxysilane copolymer. A viscosity of the vinyl imidazole-vinyl trimethoxysilane copolymer was measured by using a rheometer, and the obtained viscosity was 16 kPa s. Due to the introducing the vinyl imidazole-vinyl trimethoxy silane copolymer to the copper phosphate aqueous solution, a corrosion-protective coating layer was able to be formed on the copper surface. When the amount of the initiator was 5 mg or less, all monomers were not completely polymerized.

EXAMPLE 12

Like in the same manner as in Example 8, 50 mg of an initiator was used and radical polymerization was performed thereon to produce a vinyl imidazole-vinyl trimethoxysilane copolymer. A viscosity of the vinyl imidazole-vinyl trimethoxysilane copolymer was measured by using a rheometer, and the obtained viscosity was 10 kPa s. Due to the introducing the vinyl imidazole-vinyl trimethoxy silane copolymer to the copper phosphate aqueous solution, a corrosion-protective coating layer was able to be formed on the copper surface. When the amount of the initiator was 50 mg or more, an oligomer having a small molecular weight may be formed.

EXAMPLE 13

Like in the same manner as in Example 8, 5 mL of the vinyl imidazole-vinyl trimethoxy silane copolymer was introduced to the copper phosphate aqueous solution, thereby forming a corrosion-protective coating layer on the copper surface. When the amount of the vinyl imidazole-vinyl trimethoxy silane copolymer was 5 mL or less, it was seen that the corrosion-protective coating layer was not formed on the copper surface.

EXAMPLE 14

Like in the same manner as in Example 8, 10 mL of the vinyl imidazole-vinyl trimethoxy silane copolymer was introduced to the copper phosphate aqueous solution, thereby forming a corrosion-protective coating layer on the copper surface. When the amount of the vinyl imidazole-vinyl trimethoxysilane copolymer was 10 mL or more, the corrosion-protective coating layer may be inefficiently formed, leading to an increase in manufacturing costs.

EXAMPLE 15

16 g of a styrenesulfonate monomer was completely dissolved in 32 ml of an aqueous solution in a constant-temperature bath while the temperature was maintained at 45° C. As an initiator for the styrenesulfonate monomer, 15 mg of 2,2-azobisisobutyronitrile was used. Then, a solution polymerization was performed thereon for 12 hours to prepare a poly(4-styrenesulfonate) aqueous solution having a negative charge in an aqueous solution. Viscosity of the poly(4-styrenesulfonate) aqueous solution was measured by using a rheometer. The viscosity was 54 kPa s.

7 mL of a poly(4-styrenesulfonate) aqueous solution was added to the copper phosphate aqueous solution including the corrosion-protective coating layer through a syringe, and then, the resultant was stirred for 2 hours, and then subjected to centrifuging at a rate of 7,000 rpm, for 20 minutes. The obtained centrifuging product was re-distributed in ethanol, and then, twice subjected to centrifuging to obtain copper paste. The copper paste was subjected to an agate mortar to prepare copper paste having high dispersability. Viscosity of the obtained copper paste was measured by using a rheometer. The viscosity was 28 kPa s (FIGS. 1A and 1B).

EXAMPLE 16

Like in the same manner as in Example 15, 12 mg of an initiator was used to cause radical polymerization, thereby producing a poly(4-styrenesulfonate) aqueous solution. The viscosity thereof measured by using a rheometer was 48 kPa s.

The poly(4-styrenesulfonate) aqueous solution was added to the copper phosphate aqueous solution including the corrosion-protective coating layer, and then, the resultant was stirred for 2 hours. Copper paste having excellent dispersability was able to be prepared by using a centrifuger and an agate mortar. Viscosity of the obtained copper paste was measured by using a rheometer. The viscosity was 25 kPa s.

When the amount of the initiator was 12 mg or less, monomers were not completely polymerized.

EXAMPLE 17

Like in the same manner as in Example 15, 24 mg of an initiator was used to cause radical polymerization, thereby producing a poly(4-styrenesulfonate) aqueous solution. The viscosity thereof measured by using a rheometer was 50 kPa s.

The poly(4-styrenesulfonate) aqueous solution was added to the copper phosphate aqueous solution including the corrosion-protective coating layer, and then, the resultant was stirred for 2 hours. Copper paste having excellent dispersability was able to be prepared by using a centrifuger and an agate mortar. Viscosity of the obtained copper paste was measured by using a rheometer. The viscosity was 23 kPa s.

When the amount of the initiator was 24 mg or more, an oligomer having a small molecular weight may be formed.

EXAMPLE 18

Like in the same manner as in Example 15, 5 mL of the poly(4-styrenesulfonate) aqueous solution was added to the copper phosphate aqueous solution including the corrosion-protective coating layer through a syringe, and then, the resultant was stirred for 2 hours. Copper paste having excellent dispersability was able to be prepared by using a centrifuger and an agate mortar. Viscosity of the obtained copper paste was measured by using a rheometer. The viscosity was 15 kPa s. When the amount of the poly(4-styrenesulfonate) aqueous solution was 5 mL or less, it was seem that due to the low viscosity of the copper paste after the centrifuging, the copper paste was not able to be used as screen printing ink.

EXAMPLE 19

Like in the same manner as in Example 15, 10 mL of the poly(4-styrenesulfonate) aqueous solution was added to the copper phosphate aqueous solution including the corrosion-protective coating layer through a syringe, and then, the resultant was stirred for 2 hours. Copper paste having excellent dispersability was able to be prepared by using a centrifuger and an agate mortar. Viscosity of the obtained copper paste was measured by using a rheometer. The viscosity was 40 kPa s. When the amount of the poly(4-styrenesulfonate) aqueous solution was 10 mL or more, it was seem that due to the high viscosity of the copper paste after the centrifuging, the copper paste was not able to be used as screen printing ink, and conductivity of the copper paste was low.

EXAMPLE 20

Like in the same manner as in Example 15, the poly(4-styrenesulfonate) aqueous solution was added to the copper phosphate aqueous solution including the corrosion-protective coating layer, and then, the resultant was stirred for 1 hour. Copper paste having excellent dispersability was able to be prepared by using a centrifuger and an agate mortar. Viscosity of the obtained copper paste was measured by using a rheometer. The viscosity was 50 kPa s. When the stirring time was 1 hour or less, it was seen that the dispersability of the copper paste was very low.

EXAMPLE 21

Like in the same manner as in Example 15, the poly(4-styrenesulfonate) aqueous solution was added to the copper phosphate aqueous solution including the corrosion-protective coating layer, and then, the resultant was stirred for 3 hours. Copper paste having excellent dispersability was able to be prepared by using a centrifuger and an agate mortar. Viscosity of the obtained copper paste was measured by using a rheometer. The viscosity was 47 kPa s. When the stirring time was 3 hours or more, it was seen that due to a long stirring time, the copper surface was oxidized.

EXAMPLE 22

Like in the same manner as in Example 15, the poly(4-styrenesulfonate) aqueous solution was added to the copper phosphate aqueous solution including the corrosion-protective coating layer, and then, the resultant was stirred. Then, centrifuging was performed thereon at a rate of 5,000 rpm for 30 minutes. The resultant was re-distributed in ethanol and then twice centrifuged to obtain copper paste by using a centrifuger. The viscosity of the obtained copper paste was measured by using a rheometer. The viscosity was 35 kPa s. When a precipitation speed of the centrifuger was 5,000 rpm or less, the yield was very low.

EXAMPLE 23

Like in the same manner as in Example 15, the poly(4-styrenesulfonate) aqueous solution was added to the copper phosphate aqueous solution including the corrosion-protective coating layer, and then, the resultant was stirred. Then, centrifuging was performed thereon at a rate of 10,000 rpm for 5 minutes. The resultant was re-distributed in ethanol and then twice centrifuged to obtain copper paste. The viscosity of the obtained copper paste was measured by using a rheometer. The viscosity was 55 kPa s. When a precipitation speed of the centrifuger was 10,000 rpm or more, the yield was very low.

EXAMPLE 24

Copper paste ink was once printed on a flexible polyethyleneterephthalate film at a printing speed of 5,000 rpm to form a copper paste thin film. In this case, a mask having a fine mesh having 270 pores within an interval of 1 cm was used to design a ring pattern having an inner diameter of 10 mm and an outer diameter of 13 mm.

Figure 2:
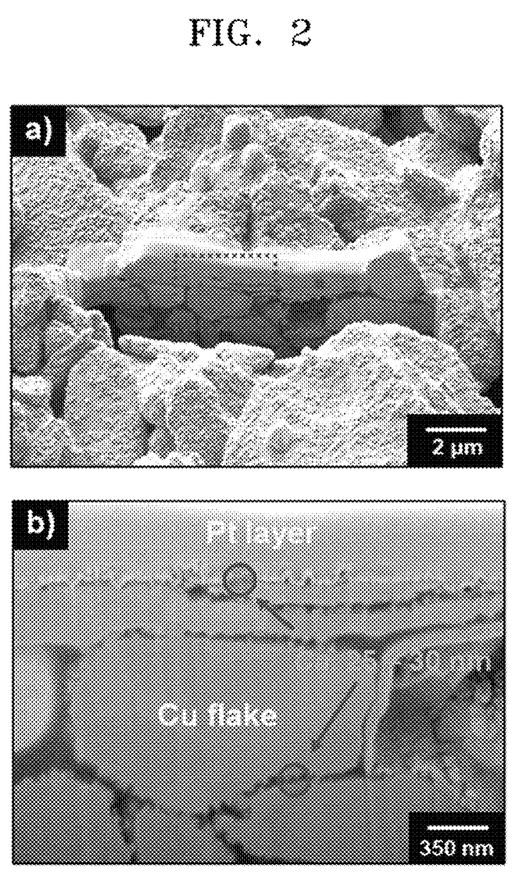
FIG. 2 shows a scan electron microscopic image of a copper paste thin film formed according to Example 24 after exposure to focused ion-beams.

The resultant structure was analyzed by scanning electron microscopy after exposure to focused ion-beams. The results show that among copper powder, a copper phosphate and vinyl imidazole-vinyl trimethoxysilane copolymer-based corrosion-protective coating layer having a thickness of 50 to 70 nm, and poly(4-styrenesulfonate) was present (FIG. 2).

Figure 3:
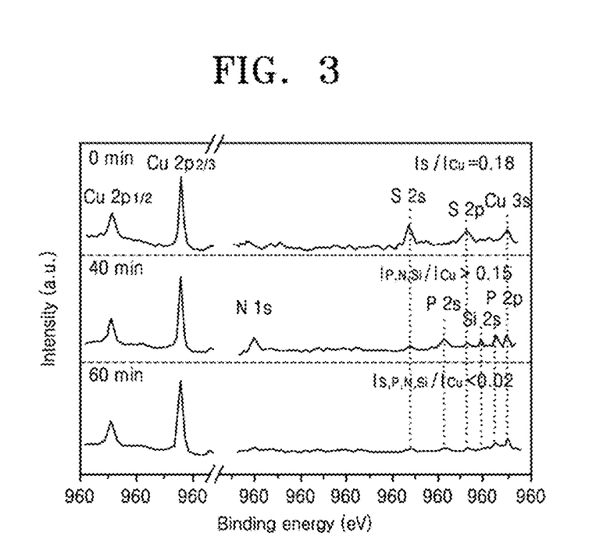
FIG. 3 shows results of X-ray photoelectric analysis on a copper paste thin film formed according to Example 24.
Figure 4A:
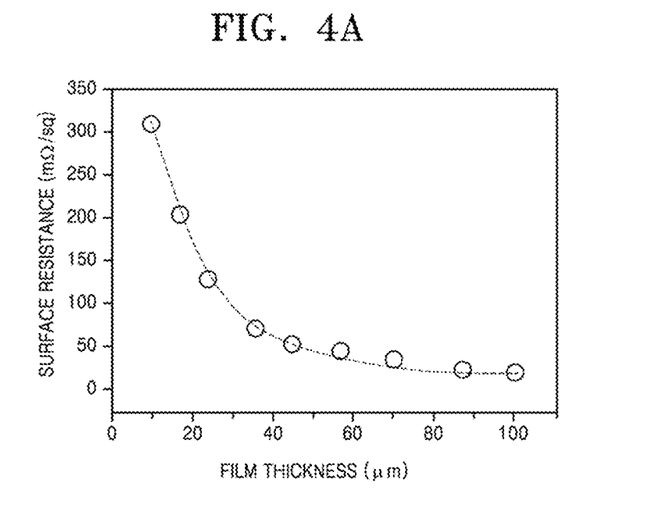
FIG. 4A is a graph showing resistance characteristics of copper paste thin films formed according to Examples 24, 26, 29, 30, and 31 with respect to thickness.
Figure 4B:
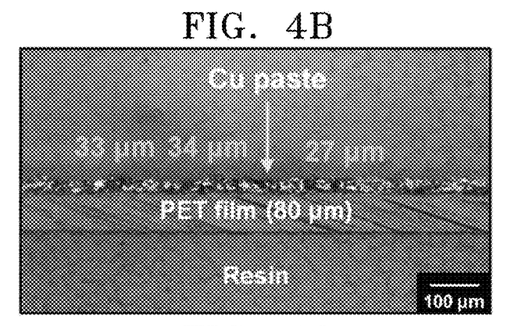
FIG. 4B shows an image of a sample associated with FIG. 4A.
Figure 4C:
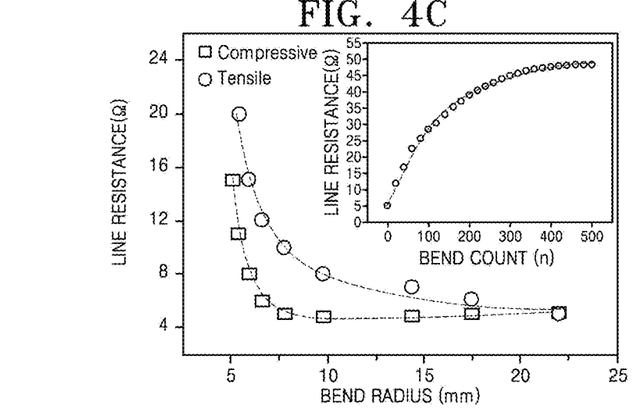
FIG. 4C is a graph showing resistance characteristics of the copper paste thin films formed according to Examples 24, 26, 29, 30, and 31 with respect to bend radius and bending time.
Figure 4D:
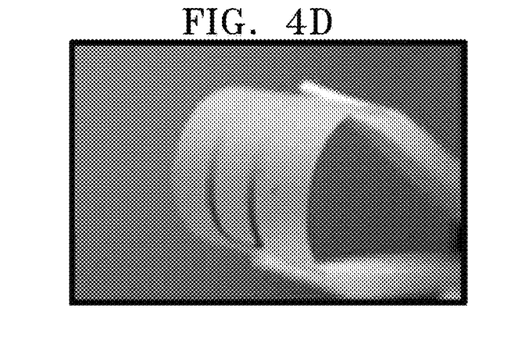
FIG. 4D shows an image of a sample associated with FIG. 4C.

The resultant structure was also analyzed according to a depth profile of X-ray photoelectron spectroscopy (XPS). The results show the formation of a copper phosphate and vinyl imidazole-vinyl trimethoxysilane copolymer based corrosion-protective coating layer having a thickness of about 15 to 20 nm (FIG. 3).

Characteristics of the copper paste thin film were analyzed. A thickness thereof was measured by using a Vernier Caliper, and the result was about 36 μm. A surface resistance thereof was measured, and the result was constant and 72 mΩ/□. When a mask having a fine mesh having 270 pores or less within an interval of 1 cm was used, a thickness of the formed copper paste thin film increased, and thus, the formed copper paste thin film was easily delaminated when an external power was applied thereto on a flexible film (FIGS. 4A to 4D).

A heat resistance test was performed on the formed copper paste thin film. To do this, a heat treatment was performed by using a hot bar and a hot press at a temperature of 180° C. for 1 minute, and then, a surface resistance thereof was measured. The result was 80 mΩ/□, indicating excellent heat-resistance characteristics.

EXAMPLE 25

Like in the same manner as in Example 24, copper paste ink was once printed on a flexible polyimide film to prepare a copper paste thin film. A thickness of the formed thin film was about 65 μm. A surface resistance thereof was measured, and the result was constant and 25 mΩ/□.

EXAMPLE 26

Like in the same manner as in Example 24, a copper paste thin film was formed by using a mask having a fine mesh having 300 pores within an interval of 1 cm. A thickness of the formed thin film was about 10 μm. A surface resistance thereof was measured, and the result was constant and 310 mΩ/□. When a mask having a fine mesh having 300 pores or more within an interval of 1 cm, the manufacturing costs are high (FIGS. 4A to 4D).

EXAMPLE 27

Like in the same manner as in Example 24, copper paste ink was once printed on a flexible polyethyleneterephthalate film at a printing speed of 4,500 rpm to prepare a copper paste thin film. A thickness thereof was about 40 μm, and a surface resistance thereof was constant and 60 mΩ/□. When the printing speed was 4,500 rpm or less, resolution of the formed copper paste thin film was decreased.

EXAMPLE 28

Like in the same manner as in Example 24, copper paste ink was once printed on a flexible polyethyleneterephthalate film at a printing speed of 6,000 rpm to prepare a copper paste thin film. A thickness thereof was about 30 μm, and a surface resistance thereof was constant and 81 mΩ/□. When the printing speed was 6,000 rpm or more, the copper paste ink was not able to be appropriately deposited on the flexible film.

EXAMPLE 29

Regarding the copper paste thin film prepared according to Example 24, surface resistance characteristics with respect to bending were identified. When a compressive strain was applied to the copper paste thin film, at a bend radius of at least 5 mm, a line resistance between opposite ends of the copper paste thin film was 15Ω. When the bend radius was 10 mm, due to structural packing, the line resistance was at least 5Ω, and when the bend radius increased, the line resistance also slightly increased (FIGS. 4A to 4D).

EXAMPLE 30

Regarding the copper paste thin film prepared according to Example 24, surface resistance characteristics with respect to bending were identified. When a compressive strain was applied to the copper paste thin film, at a bend radius of at least 5 mm, a line resistance between opposite ends of the copper paste thin film was 20Ω. When the bend radius increased, the line resistance was decreased, and thus, when the bend radius was 22.5 mm, the line resistance was about 4.5 Ω (FIGS. 4A to 4D).

EXAMPLE 31

Regarding the copper paste thin film prepared according to Example 24, surface resistance characteristics with respect to bending were identified. A compressive strain was a total of 500 times applied to the copper paste thin film. As a result, post-bending surface resistance thereof in a flat state was 48Ω/□. This result shows that the copper paste thin film has excellent mechanical properties (FIGS. 4A to 4D).

EXAMPLE 32

Figure 5:
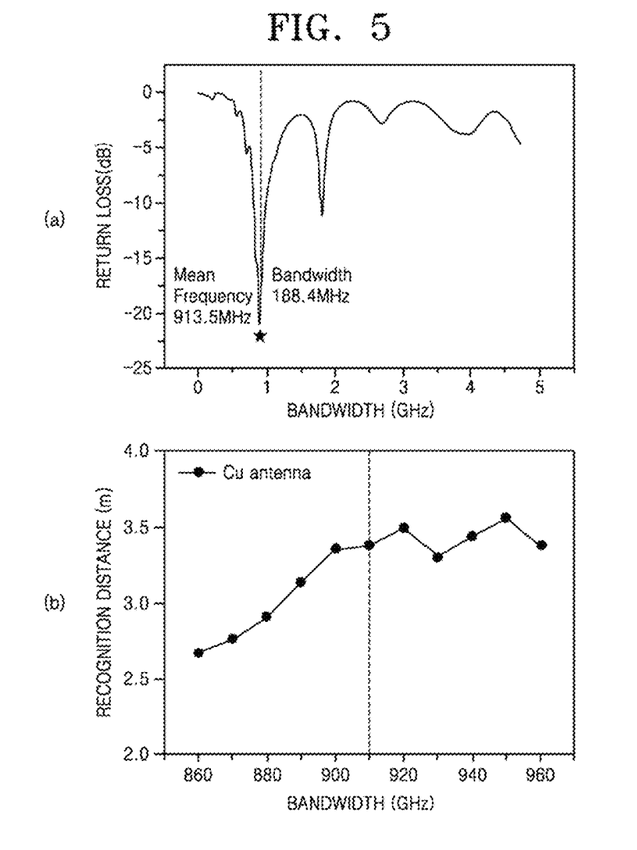
FIG. 5 is a graph showing performance of a dipole tag antenna based on a copper paste thin film formed according to Example 32.

Characteristics of a dipole tag antenna including the ring-pattern copper paste thin film formed according to Example 24 were analyzed. Opposite ends of a dipole tag antenna electrode based on the copper paste thin film were connected to a 0.5 mm metal cable of an antenna network analyzer port by using silver paste and copper paste. For impedance matching, the 0.5 mm metal cable had a resistance of 50Ω. By using the network analyzer, impedance values of an input terminal and an output terminal were measured to evaluate performances of the dipole tag antenna. As a result, it was seen that the dipole tag antenna showed excellent characteristics, including a center frequency of 913.5 MHz, a band width of 188.4 MHz, a voltage standing wave ratio of 1.19, a return loss of 21.2, a transmitted power efficiency of 99.2%, and a recognition distance of 3.4 m (FIG. 5).

EXAMPLE 33

Like in the same manner as in Examples 1, 8, 15, 24, and 32, spherical copper powder was etched by using a hydrochloric acid aqueous solution, and a phosphoric acid aqueous solution was added thereto to prepare a copper phosphate aqueous solution. Then, a vinyl imidazole-vinyl trimethoxysilane copolymer was introduced to form a corrosion-protective coating layer. A poly(4-styrenesulfonate) aqueous solution was added thereto, and then stirred for 2 hours. The resultant was subjected to a centrifuger and agate mortar, and viscosity of the obtained copper paste was measured. The viscosity was 24 kPa s.

The prepared copper paste was screen-printed to form a copper paste thin film. The copper paste thin film had a thickness of about 33 μm and a constant surface resistance of 80 mΩ/□. The copper paste thin film was heat treated by using a hot bar and a hot press at a temperature of 180° C. for 1 minute, and then, a surface resistance thereof was measured. The surface resistance thereof was 85 mΩ/□, indicating that the copper paste thin film had excellent heat-resistance characteristics.

A dipole tag antenna analysis was performed. As a result, it was seen that the dipole tag antenna showed excellent characteristics, including a center frequency of 910.8 MHz, a band width of 180.5 MHz, a voltage standing wave ratio of 1.25, a return loss of 19.1, a transmitted power efficiency of 98.8%, and a recognition distance of 3.1 m.

EXAMPLE 34

Like in the same manner as in Examples 1, 8, 15, 24, and 32, bead copper powder was etched by using a hydrochloric acid aqueous solution, and a phosphoric acid aqueous solution was added thereto to prepare a copper phosphate aqueous solution. Then, a vinyl imidazole-vinyl trimethoxysilane copolymer was introduced to form a corrosion-protective coating layer. A poly(4-styrenesulfonate) aqueous solution was added thereto, and then stirred for 2 hours. The resultant was subjected to a centrifuger and agate mortar, and viscosity of the obtained copper paste was measured. The viscosity was 17 kPa s.

The prepared copper paste was screen-printed to form a copper paste thin film. The copper paste thin film had a thickness of about 31 μm and a constant surface resistance of 110 mΩ/□. The copper paste thin film was heat treated by using a hot bar and a hot press at a temperature of 180° C. for 1 minute, and then, a surface resistance thereof was measured. The surface resistance thereof was 137 mΩ/□, indicating that the copper paste thin film had excellent heat-resistance characteristics.

A dipole tag antenna analysis was performed. As a result, it was seen that the dipole tag antenna showed excellent characteristics, including a center frequency of 908.3 MHz, a band width of 80.4 MHz, a voltage standing wave ratio of 1.32, a return loss of 17.2, a transmitted power efficiency of 98.1%, and a recognition distance of 2.9 m.

EXAMPLE 35

Like in the same manner as in Examples 1, 8, 15, 24, and 32, dendrite copper powder was etched by using a hydrochloric acid aqueous solution, and a phosphoric acid aqueous solution was added thereto to prepare a copper phosphate aqueous solution. Then, a vinyl imidazole-vinyl trimethoxysilane copolymer was introduced to form a corrosion-protective coating layer. A poly(4-styrenesulfonate) aqueous solution was added thereto, and then stirred for 2 hours. The resultant was subjected to a centrifuger and agate mortar, and viscosity of the obtained copper paste was measured. The viscosity was 28 kPa s.

The prepared copper paste was screen-printed to form a copper paste thin film. The copper paste thin film had a thickness of about 33 μm and a constant surface resistance of 91 mΩ/□. The copper paste thin film was heat treated by using a hot bar and a hot press at a temperature of 180° C.

for 1 minute, and then, a surface resistance thereof was measured. The surface resistance thereof was 94 mΩ/□, indicating that the copper paste thin film had excellent heat-resistance characteristics.

A dipole tag antenna analysis was performed. As a result, it was seen that the dipole tag antenna showed excellent characteristics, including a center frequency of 910.3 MHz, a band width of 140.2 MHz, a voltage standing wave ratio of 1.27, a return loss of 18.5, a transmitted power efficiency of 98.6%, and a recognition distance of 3.2 m.

As described above, the present invention is directed to a method of preparing a corrosion-protective copper paste through a single process and the application thereof to a dipole tag antenna. In inert gas atmosphere, the surface of copper powder is etched by using a hydrochloric acid, a phosphoric acid aqueous solution is added thereto to form copper phosphate on the etched surface of copper powder, and a vinyl imidazole-silane copolymer and poly(4-styrenesulfonate) are introduced thereto to form a corrosion-protective coating layer on the surface of copper powder on which the copper phosphate has been formed. Then, a centrifuger and an agate mortar are used to prepare copper paste having high viscosity and excellent dispersability. When the resultant copper paste is screen-printed on a flexible film to form a copper paste thin film, the formed dipole tag antenna may have high efficiency and excellent characteristics.

According to embodiments of the present invention, a series of corrosion-protective processes may be performed on copper powder. By doing so, without a thermosetting process, copper paste having high heat resistance and high electric conductivity can be easily prepared through a single process. A copper paste thin film according to embodiments is not limited to a particular size and pattern, and also, due to the use of copper powder having a competitive edge in terms of price, low-cost production was able to be achieved in great quantities. In terms of electric application, the formed copper paste thin film has uniform electric conductivity characteristics, and when bent due to an external force, the copper paste thin film may retain high flexible characteristics. Accordingly, copper paste according to embodiments is appropriate for the production of a dipole tag antenna having high-efficiency characteristics.

What is claimed is:

1. A method of preparing a copper paste for a dipole tag antenna, the method comprising:
   etching a surface of copper powder by introducing a hydrochloric acid aqueous solution to the copper powder in an inert gas atmosphere;
   forming copper phosphate by introducing a phosphoric acid aqueous solution to the surface of the copper powder that has been etched;
   forming a corrosion-protective coating layer by adding a vinyl imidazole-silane copolymer and a poly(4-styrenesulfonate) aqueous solution to the copper powder on which the copper phosphate has been formed, and
   using a centrifuge and an agate mortar, with respect to the copper powder on which the corrosion-protective coating layer has been formed.

2. The method of claim 1, wherein the copper powder is in a pattern selected from a flake pattern, a sphere pattern, a bead pattern, and a dendrite pattern.

3. The method of claim 1, wherein a volume of the copper powder is at most half a volume of a reactor.

4. The method of claim 1, wherein a volume of the hydrochloric acid aqueous solution is in a range of 1 ml to 2 ml per 1 g of the copper powder.

5. The method of claim 1, wherein a concentration of the phosphoric acid aqueous solution is in a range of 1 M to 2 M.

6. The method of claim 1, wherein a volume of the phosphoric acid aqueous solution is in a range of 3 ml to 5 ml per 1 g of the copper powder.

7. The method of claim 1, wherein when a copolymerization is performed to produce the vinyl imidazole-silane copolymer, a volume of a silane monomer is in a range of 5 parts by volume to 20 parts by volume based on 100 parts by volume of vinyl imidazole and the silane monomer.

8. The method of claim 1, wherein when a copolymerization is performed to produce the vinyl imidazole-silane copolymer, a concentration of an initiator is in a range of 0.05 parts by weight to 0.5 parts by weight based on 100 parts by weight of vinyl imidazole and a silane monomer.

9. The method of claim 1, wherein when the vinyl imidazole-silane copolymer is formed, a copolymerization time is in a range of 12 hours to 24 hours.

10. The method of claim 1, wherein when the vinyl imidazole-silane copolymer is formed, a reaction temperature is in a range of 50° C. to 70° C.

11. The method of claim 1, wherein a volume of the vinyl imidazole-silane copolymer is in a range of 0.5 ml to 1 ml based on 1 g of the copper powder.

12. The method of claim 1, wherein when the poly(4-styrenesulfonate) aqueous solution is subjected to a radical polymerization, a ratio of an initiator is in a range of 0.1 mol to 0.2 mol based on 100 mol of a styrenesulfonate monomer.

13. The method of claim 1, wherein when the poly(4-styrenesulfonate) aqueous solution is subjected to a polymerization, a reaction temperature is in a range of 40° C. to 50° C.

14. The method of claim 1, wherein the poly(4-styrenesulfonate) aqueous solution is subjected to a polymerization, a reaction time is in a range of 6 hours to 24 hours.

15. The method of claim 1, wherein a volume of the poly(4-styrenesulfonate) aqueous solution is in a range of 0.5 ml to 1 ml based on 1 g of the copper powder.

16. The method of claim 1, wherein a stirring time for forming the corrosion-protective coating layer is in a range of 1 hour to 3 hours.

17. The method of claim 1, wherein when centrifuging is performed using the centrifuge, the speed of the centrifuge is in a range of 5,000 rpm to 10,000 rpm.

18. The method of claim 1, wherein when centrifuging is performed using the centrifuge, a precipitation time of the copper paste is in a range of 5 minutes to 30 minutes.

19. The method of claim 1, wherein when centrifuging is performed using the centrifuge, a centrifuging product is re-distributed in ethanol.

20. A copper paste embodied by using the method of claim 1.

21. A method of producing a dipole tag antenna comprising copper paste, the method comprising the method of claim 1 to embody the copper paste.

22. The method of claim 21, wherein a film used to produce the dipole tag antenna comprises any one of polyethyleneterephthalate and polyimide.

23. The method of claim 21, wherein when screen printing is performed to produce the dipole tag antenna, a mask used has fine mesh having 270 pores to 300 pores within an interval of 1 centimeter.

24. The method of claim 21, wherein when the dipole tag antenna is produced, a thickness of the copper paste thin film is at most 30 micrometers.

* * * * *